(12) United States Patent
Grover

(10) Patent No.: US 12,478,421 B2
(45) Date of Patent: Nov. 25, 2025

(54) POWERING AN ELECTROCAUTERY SURGICAL INSTRUMENT

(71) Applicant: CMR SURGICAL LIMITED, Cambridge (GB)

(72) Inventor: Simon Roderick Grover, Cambridge (GB)

(73) Assignee: CMR SURGICAL LIMITED, Cambridge (GB)

( * ) Notice: Subject to any disclaimer, the term of this patent is extended or adjusted under 35 U.S.C. 154(b) by 753 days.

(21) Appl. No.: 16/623,992

(22) PCT Filed: Jun. 20, 2018

(86) PCT No.: PCT/GB2018/051716
§ 371 (c)(1),
(2) Date: Dec. 18, 2019

(87) PCT Pub. No.: WO2018/234795
PCT Pub. Date: Dec. 27, 2018

(65) Prior Publication Data
US 2020/0138510 A1    May 7, 2020

(30) Foreign Application Priority Data
Jun. 21, 2017    (GB) .................... 1709902

(51) Int. Cl.
*A61B 18/14*    (2006.01)
*A61B 34/00*    (2016.01)
*A61B 34/30*    (2016.01)
*A61B 18/00*    (2006.01)

(52) U.S. Cl.
CPC .......... *A61B 18/1445* (2013.01); *A61B 34/30* (2016.02); *A61B 34/71* (2016.02);
(Continued)

(58) Field of Classification Search
CPC ..... A61B 18/1445; A61B 34/30; A61B 34/71; A61B 34/74; A61B 2034/306;
(Continued)

(56) References Cited

U.S. PATENT DOCUMENTS

| | | | |
|---|---|---|---|
| 10,973,600 B2* | 4/2021 | Bruehwiler | ............ A61B 34/71 |
| 2002/0111621 A1* | 8/2002 | Wallace | ................. A61B 34/35 |
| | | | 606/1 |

(Continued)

FOREIGN PATENT DOCUMENTS

| | | |
|---|---|---|
| CN | 102143714 A | 8/2011 |
| IN | 103405271 A | 11/2013 |

(Continued)

OTHER PUBLICATIONS

International Search Report and the Written Opinion of the International Searching Authority from corresponding PCT/GB2018/051716 dated Aug. 29, 2018.

(Continued)

Primary Examiner — Michael F Peffley
Assistant Examiner — Bo Ouyang
(74) Attorney, Agent, or Firm — Lando & Anastasi, LLP

(57) ABSTRACT

A robotic surgical instrument comprising a shaft, an electrocautery end effector powered by an electrocautery element, and an articulation connecting the electrocautery end effector to the shaft. The articulation comprises: a first joint driveable by a first pair of driving elements which permits the electrocautery end effector to rotate about a first axis transverse to a longitudinal axis of the shaft; and a second joint driveable by a second pair of driving elements which permits the electrocautery end effector to rotate about a second axis transverse to the first axis. The electrocautery element is constrained to move around the first axis and constrained to wrap at least one full revolution around the (Continued)

second axis. The path of the electrocautery element between the shaft and the second joint symmetrically opposes the path of a first one of the second pair of driving elements between the shaft and the second joint.

18 Claims, 10 Drawing Sheets

(52) U.S. Cl.
CPC .... *A61B 34/74* (2016.02); *A61B 2018/00178* (2013.01); *A61B 2018/00595* (2013.01); *A61B 2034/306* (2016.02); *A61B 2034/715* (2016.02)

(58) Field of Classification Search
CPC .... A61B 2034/715; A61B 2018/00178; A61B 2018/00595
See application file for complete search history.

(56) References Cited

U.S. PATENT DOCUMENTS

| | | | |
|---|---|---|---|
| 2005/0240178 A1* | 10/2005 | Morley | A61B 18/1445 606/51 |
| 2006/0074415 A1 | 4/2006 | Scott et al. | |
| 2009/0326530 A1* | 12/2009 | Orban, III | A61B 34/71 606/51 |
| 2010/0016852 A1 | 1/2010 | Manzo et al. | |

FOREIGN PATENT DOCUMENTS

| | | |
|---|---|---|
| IN | 04/2020 | 1/2020 |
| JP | 2008161970 A | 7/2008 |
| JP | 2018538067 A | 12/2018 |
| WO | 2017098270 A1 | 6/2017 |
| WO | 2018234814 A1 | 12/2018 |

OTHER PUBLICATIONS

United Kingdom Search Report from corresponding United Kingdom Application No. GB1709902.9 dated Dec. 13, 2017.
First Indian Examination Report from corresponding Indian Application No. 202027000293 dated May 28, 2021.
Japanese Notification of Reasons for Refusal from corresponding Japanese Application No. 2019-571026 dated Mar. 15, 2022.
Chinese Office Action from corresponding Chinese Application No. 201880041665.3 dated Nov. 1, 2022.

* cited by examiner

POWERING AN ELECTROCAUTERY SURGICAL INSTRUMENT

CROSS-REFERENCE TO RELATED APPLICATIONS

This application is a U.S. National Phase Application under 35 U.S.C. § 371 of International Application No. PCT/GB2018/051716, filed Jun. 20, 2018, which claims priority to United Kingdom Application No. 1709902.9, filed Jun. 21, 2017. Each application referenced above is hereby incorporated by reference in its entirety for all purposes.

BACKGROUND

It is known to use robots for assisting and performing surgery. FIG. 1 illustrates a typical surgical robot 100 which consists of a base 108, an arm 102, and an instrument 105. The base supports the robot, and is itself attached rigidly to, for example, the operating theatre floor, the operating theatre ceiling or a trolley. The arm extends between the base and the instrument. The arm is articulated by means of multiple flexible joints 103 along its length, which are used to locate the surgical instrument in a desired location relative to the patient. The surgical instrument is attached to the distal end 104 of the robot arm. The surgical instrument penetrates the body of the patient 101 at a port 107 so as to access the surgical site. At its distal end, the instrument comprises an end effector 106 for engaging in a medical procedure.

A variety of end effectors are known, each adapted to perform a particular surgical function. FIG. 2 illustrates a surgical instrument 200 having an electrocautery end effector. The surgical instrument comprises a base 201 by means of which the surgical instrument connects to the robot arm. A shaft 202 extends between the base 201 and an articulation 203. Articulation 203 terminates in the electrocautery end effector 204. The articulation 203 permits the electrocautery end effector 204 to move relative to the shaft 202. It is desirable for at least two degrees of freedom to be provided to the motion of the electrocautery end effector 204 by means of the articulation.

Electrocautery end effectors receive power from a power source in order to perform their cauterising function. Typically, a power cable is connected to the electrocautery end effector. The power cable is ideally fed to the electrocautery end effector through the interior of the instrument, at least for the portion of the instrument which penetrates the patient. Thus, the power cable is ideally fed from the interior of the shaft 202, through the articulation 203 to the electrocautery end effector 204. Driving elements which drive the joints of the articulation 203 are also fed through the interior of the shaft and into the articulation. It is desirable that the electrocautery power cable fully accommodates movement of the joints of the articulation. Thus, it should not restrict movement of the articulation as a result of becoming taught. However, it should also not interfere with movement of the articulation as a result of becoming slack and catching on other components internal to the articulation. The power cable is insulated, and hence it is desirable that it does not rub on any components in the articulation which could lead to degradation of the insulation.

US 2004/0267254 describes an electrocautery end effector in which the power cable is connected to the base of the electrocautery end effector via a circular chamber in which the power cable is wound. The radial width of the channel of the chamber in which the power cable is wound significantly exceeds the width of the power cable, thereby enabling the power cable to be wound into the chamber at different and varying radii. This enables the chamber to house different lengths of cable. Thus, as the electrocautery end effector is articulated in one rotational direction, the power lead is withdrawn from the chamber to accommodate the articulation. As the end effector is articulated in the other rotational direction the power lead is further wound up in the chamber to accommodate the articulation.

US 2004/0267254 thereby describes an electrocautery instrument which enables the power cable to accommodate movement of the joints of the articulation without interfering with that movement. However, US 2004/0267254 relates to an electrocautery instrument having an external diameter of the order of 8 mm or greater. It is desirable to reduce the external diameter of surgical instruments in order to minimise internal tissue damage, and hence increase the body's ability to heal internally following an operation, thereby reducing recovery time. The mechanism described in US 2004/0267254 for managing the power cable of the electrocautery instrument is not effective for an instrument having a smaller external diameter, for example of less than 6 mm. This is because accommodating the power cable through changes in its wound radii in a chamber put too much strain on the power cable.

Thus, there is a need for an effective mechanism for managing the supply of power to an electrocautery end effector, which is suitable for a robotic surgical instrument having a small external diameter.

SUMMARY OF THE INVENTION

According to an aspect of the invention, there is provided a robotic surgical instrument comprising: a shaft; an electrocautery end effector powered by an electrocautery element; and an articulation connecting the electrocautery end effector to the shaft, the articulation comprising: a first joint driveable by a first pair of driving elements, the first joint permitting the electrocautery end effector to rotate about a first axis transverse to a longitudinal axis of the shaft, and a second joint driveable by a second pair of driving elements, the second joint permitting the electrocautery end effector to rotate about a second axis transverse to the first axis; wherein the electrocautery element is constrained to move around the first axis and constrained to wrap at least one full revolution around the second axis; wherein the path of the electrocautery element between the shaft and the second joint symmetrically opposes the path of a first one of the second pair of driving elements between the shaft and the second joint.

The electrocautery element may be constrained to wrap at least one and a half revolutions around the second axis.

The electrocautery element may be seated in a groove about the second axis.

The articulation may comprise a pulley arrangement around which the second pair of driving elements and the electrocautery element are constrained to move, the electrocautery element and the first one of the second pair of driving elements having symmetrically opposing paths around the pulley arrangement.

The pulley arrangement may comprise a first set of pulleys rotatable about the first axis.

The pulley arrangement may comprise a second set of pulleys located between the first axis and the shaft.

The pulley arrangement may comprise a third set of pulleys located between the first axis and the second axis.

The electrocautery element may be bonded to a second one of the second pair of driving elements in the shaft.

The second one of the second pair of driving elements may comprise a flexible portion and a spoke, the electrocautery element being bonded to the spoke.

The electrocautery element may be connected to the electrocautery end effector.

The electrocautery element may terminate at the electrocautery end effector.

The electrocautery element may be overmoulded with insulation material where it terminates at the electrocautery end effector.

The electrocautery element may be a cable.

The first pair of driving elements may be cables in the articulation.

The second pair of driving elements may be cables in the articulation.

The electrocautery element and the pairs of driving elements may resist compression and tension forces.

BRIEF DESCRIPTION OF THE FIGURES

The present invention will now be described by way of example with reference to the accompanying drawings. In the drawings.

DETAILED DESCRIPTION

Figure 3:
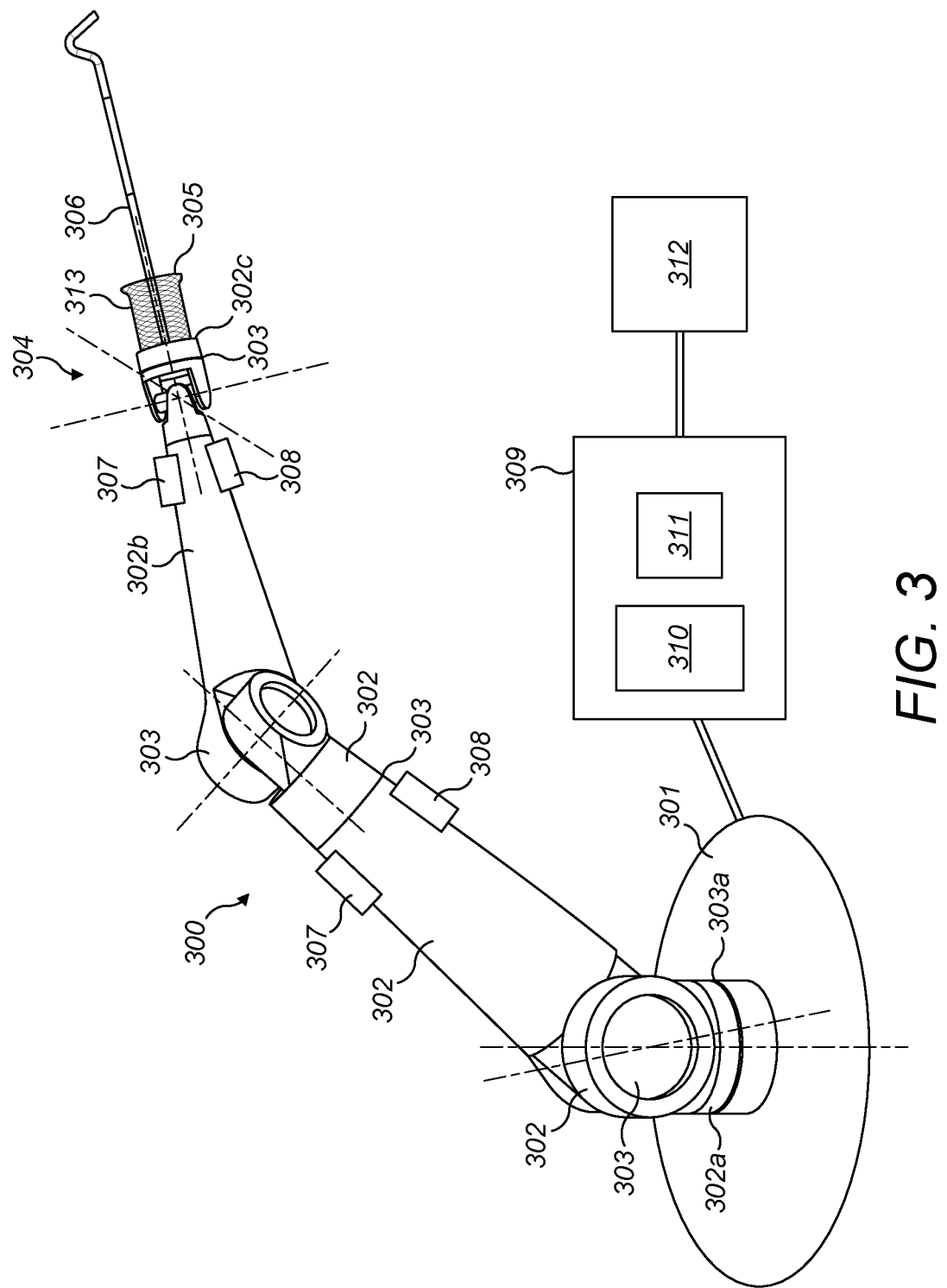
FIG. 3 illustrates a surgical robot.

FIG. 3 illustrates a surgical robot having an arm 300 which extends from a base 301. The arm comprises a number of rigid limbs 302. The limbs are coupled by revolute joints 303. The most proximal limb 302a is coupled to the base by joint 303a. It and the other limbs are coupled in series by further ones of the joints 303. Suitably, a wrist 304 is made up of four individual revolute joints. The wrist 304 couples one limb (302b) to the most distal limb (302c) of the arm. The most distal limb 302c carries an attachment 305 for a surgical electrocautery instrument 306. Each joint 303 of the arm has one or more motors 307 which can be operated to cause rotational motion at the respective joint, and one or more position and/or torque sensors 308 which provide information regarding the current configuration and/or load at that joint. Suitably, the motors are arranged proximally of the joints whose motion they drive, so as to improve weight distribution. For clarity, only some of the motors and sensors are shown in FIG. 3. The arm may be generally as described in the applicant's co-pending patent application PCT/GB2014/053523.

Figure 1:
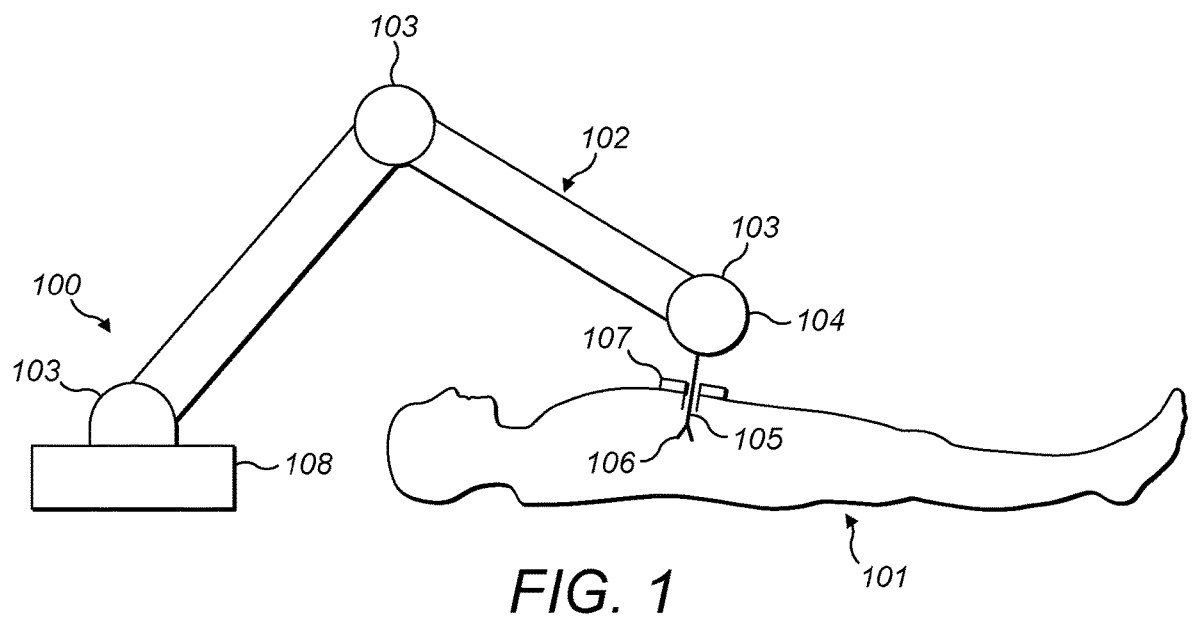
FIG. 1 illustrates a surgical robot performing a surgical procedure.
Figure 2:
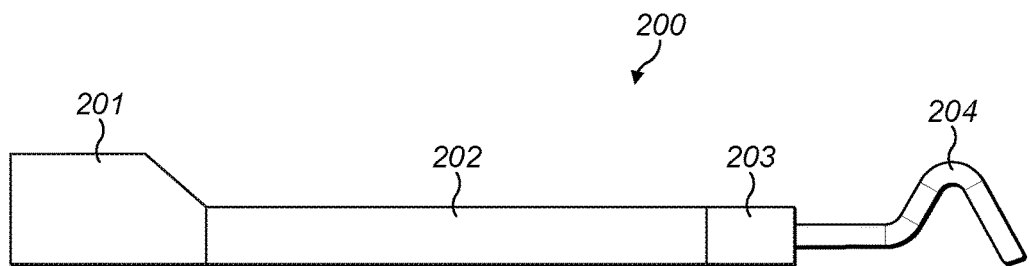
FIG. 2 illustrates a typical electrocautery instrument.

The arm terminates in an arm interface 305 for interfacing with an instrument interface 313 of the electrocautery instrument 306. Suitably, the instrument 306 takes the form described with respect to FIG. 2. The instrument has a diameter less than 8 mm. Suitably, the instrument has diameter less than 6 mm. The instrument diameter may be between 5 mm and 6 mm. The instrument diameter may be the diameter of the shaft. The instrument diameter may be the diameter of the profile of the articulation. Suitably, the diameter of the profile of the articulation matches or is narrower than the diameter of the shaft. The arm interface 405 comprises a drive assembly for driving articulation of the electrocautery instrument. Movable interface elements of the drive assembly interface mechanically engage corresponding movable interface elements of the instrument interface in order to transfer drive from the robot arm to the instrument. One instrument is exchanged for another several times during a typical operation. Thus, the instrument is attachable and detachable from the robot arm during the operation.

The electrocautery instrument 306 comprises an electrocautery end effector for cauterising tissue at the surgical site. As described with respect to FIG. 2, the electrocautery instrument comprises an articulation between the instrument shaft and the electrocautery end effector. The articulation comprises several joints which permit the electrocautery end effector to move relative to the shaft of the instrument. The joints in the articulation are actuated by driving elements, such as cables. These driving elements are secured at the other end of the instrument shaft to the interface elements of the instrument interface. Thus, the robot arm transfers drive to the electrocautery end effector as follows: movement of a drive assembly interface element moves an instrument interface element which moves a driving element which moves a joint of the articulation which moves the electrocautery end effector.

The electrocautery end effector is powered by an electrocautery element which passes through the interior of the instrument shaft and the interior of the articulation to its connection point with the electrocautery end effector.

Controllers for the motors, torque sensors and encoders are distributed with the robot arm. The controllers are connected via a communication bus to control unit 309. A control unit 309 comprises a processor 310 and a memory 311. Memory 311 stores in a non-transient way software that is executable by the processor to control the operation of the motors 307 to cause the arm 300 to operate in the manner described herein. In particular, the software can control the processor 310 to cause the motors (for example via distributed controllers) to drive in dependence on inputs from the sensors 308 and from a surgeon command interface 312. The control unit 309 is coupled to the motors 307 for driving them in accordance with outputs generated by execution of the software. The control unit 309 is coupled to the sensors 308 for receiving sensed input from the sensors, and to the command interface 312 for receiving input from it. The respective couplings may, for example, each be electrical or optical cables, or may be provided by a wireless connection. The command interface 312 comprises one or more input devices whereby a user can request motion of the end effector in a desired way. The input devices could, for example, be manually operable mechanical input devices such as control handles or joysticks, or contactless input devices such as optical gesture sensors. The software stored in memory 311 is configured to respond to those inputs and cause the joints of the arm and instrument to move accordingly, in compliance with a pre-determined control strategy. The control strategy may include safety features which moderate the motion of the arm and instrument in response to command inputs.

The command interface 312 also comprises one or more inputs whereby the user can request activation and/or deactivation of the electrocautery instrument. The software stored in memory 311 may be configured to respond to these inputs by causing power to the electrocautery instrument to be activated and/or deactivated in compliance with a predetermined control strategy. The control strategy may include safety features which only cause power to be applied to the electrocautery instrument if certain conditions are met. Alternatively, the input from the user requesting activation/deactivation of power to the electrocautery instrument may bypass the control unit 309 and directly cause power to be applied to/withdrawn from the electrocautery instrument. Alternatively, the input from the user requesting activation/deactivation of power to the electrocautery instrument may pass to a separate control unit from control unit 309. That separate control unit comprises a processor and memory. The memory stores in a non-transient way software that is executable by the processor to apply and withdraw power to the electrocautery instrument in compliance with a predetermined control strategy. The control strategy may include safety features which only cause power to be applied to the electrocautery instrument if certain conditions are met.

Thus, in summary, a surgeon at the command interface 312 can control the electrocautery instrument 306 to move and can also control power to the electrocautery instrument to be activated/deactivated in such a way as to perform a desired surgical procedure. The control unit 309 and/or the command interface 312 may be remote from the arm 300.

Figure 4:
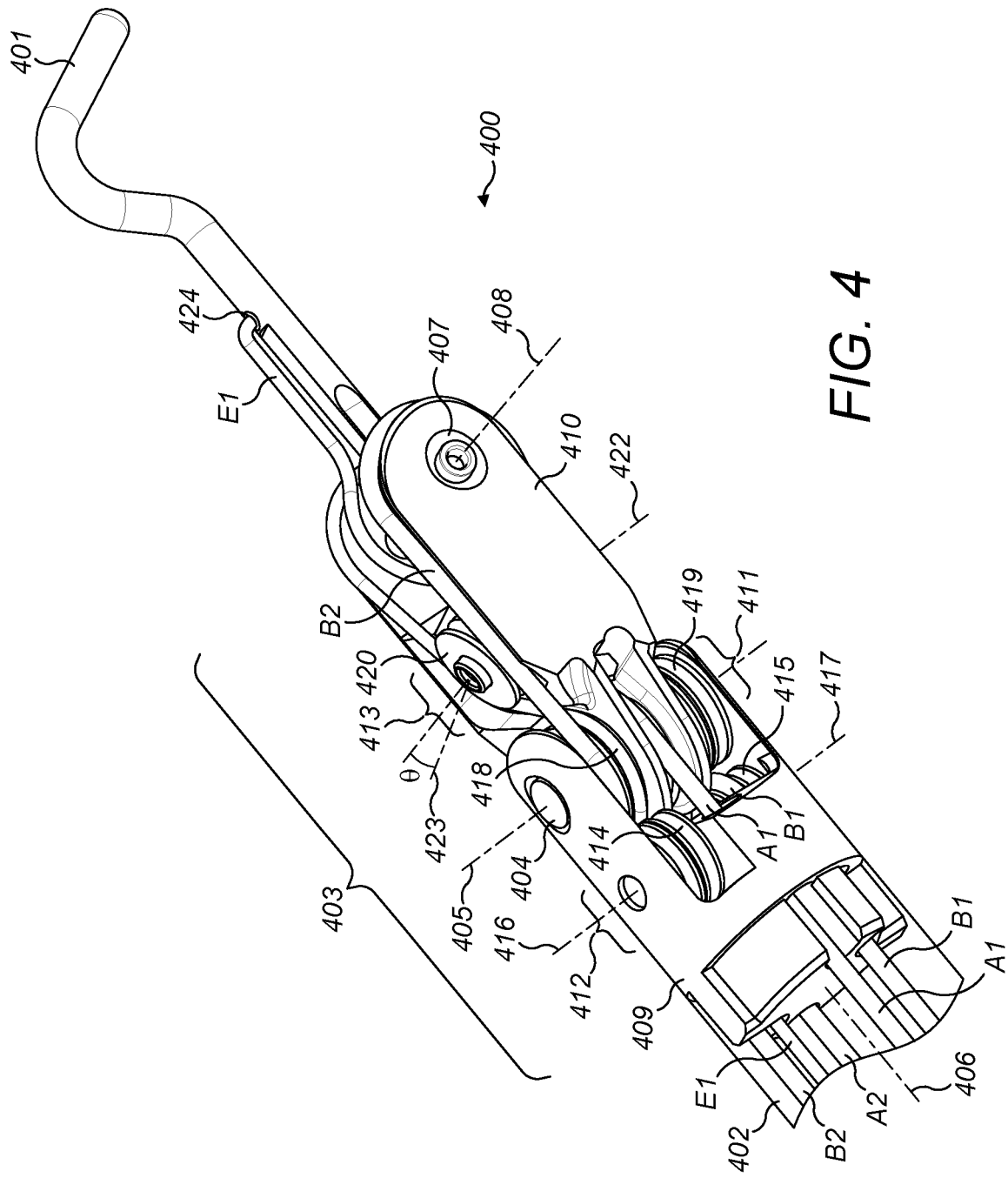
FIGS. 4 and 5 illustrate a distal end of an electrocautery instrument.

FIG. 4 illustrates the distal end of an electrocautery instrument 400. The electrocautery end effector 401 illustrated is a monopolar hook. It will be understood that this is for illustrative purposes only. The electrocautery end effector may take any suitable shape. The electrocautery end effector 401 is connected to the shaft 402 by articulation 403. Articulation 403 comprises joints which permit the electrocautery end effector 401 to move relative to the shaft 402. A first joint 404 permits the electrocautery end effector 401 to rotate about a first axis 405. The first axis 405 is transverse to the longitudinal axis of the shaft 406. A second joint 407 permits the electrocautery end effector 401 to rotate about a second axis 408. The second axis 408 is transverse to the first axis 405.

FIG. 4 depicts a straight configuration of the electrocautery instrument in which the electrocautery end effector is aligned with the shaft. In this orientation, the longitudinal axis of the shaft 406 is coincident with the longitudinal axis of the articulation and the longitudinal axis of the electrocautery end effector. Articulation of the first and second joints enables the electrocautery end effector to take a range of attitudes relative to the shaft.

The articulation 403 comprises a first body part 409 and a second body part 410. The first body part connects the shaft 402 to the second body part 410. The first body part 409 is fast with the shaft 402. The first body part is connected to the second body part by the first joint 404. The second body part 410 connects the first body part 409 to the electrocautery end effector 401. The second body part 410 is connected to the first body part by the first joint 404, and is connected to the electrocautery end effector 401 by the second joint 407. Thus, the first joint 404 permits the second body part 410 to rotate relative to the shaft 402 about the first axis 405; and the second joint 407 permits the electrocautery end effector 401 to rotate relative to the second body part 410 about the second axis 408.

The joints of the articulation are driven by driving elements. The driving elements are elongate elements which extend from the joints in the articulation through the shaft to the instrument interface. Suitably, each driving element can be flexed laterally to its main extent at least in those regions where it engages the internal components of the articulation and instrument interface. In other words, each driving element can be flexed transverse to its longitudinal axis in the specified regions. This flexibility enables the driving elements to wrap around the internal structure of the instrument, such as the joints and pulleys. The driving elements may be wholly flexible transverse to their longitudinal axes. The driving elements are not flexible along their main extents. The driving elements resist compression and tension forces applied along their length. In other words, the driving elements resist compression and tension forces acting in the direction of their longitudinal axes. The driving elements have a high modulus. The driving elements remain taut in operation. They are not permitted to become slack. Thus, the driving elements are able to transfer drive from the instrument interface to the joints. The driving elements may be cables.

Suitably, each joint is driven by a pair of driving elements. The first joint 404 is driven by a first pair of driving elements A1,A2. The second joint 407 is driven by a second pair of driving elements B1,B2. Suitably, each joint is driven by its own pair of driving elements. In other words, each joint is driven by a dedicated pair of driving elements. Suitably, the joints are independently driven. A pair of driving elements may be constructed as a single piece. This single piece may be secured to the joint at one point, thereby ensuring that when the pair of driving elements is driven, the drive is transferred to motion of the joint about its axis. Alternatively, a pair of driving elements may be constructed as two pieces. In this case, each separate piece is secured to the joint.

The electrocautery end effector 401 is powered by an electrocautery element E1. The electrocautery element E1 is connected to the electrocautery end effector 401. Suitably, the electrocautery element E1 terminates at the electrocautery end effector 401. The electrocautery element E1 may be overmoulded with insulation material where it terminates at the electrocautery end effector. The electrocautery element E1 extends from the electrocautery end effector 401 through the articulation, through the shaft to the instrument interface. Suitably, the electrocautery element can be flexed laterally to its main extent at least in those regions where it engages the internal components of the articulation and instrument interface. In other words, the electrocautery element can be flexed transverse to its longitudinal axis in the specified regions. This flexibility enables the electrocautery element to wrap around the internal structure of the instrument, such as the joints and pulleys. The electrocautery element may be wholly flexible transverse to its longitudinal axis. The electrocautery element may not be flexible along its main extent. The electrocautery element resists compression and tension forces applied along its length. In other words, the electrocautery element resists compression and tension forces acting in the direction of its longitudinal axis. The electrocautery element has a high modulus. The electrocautery element remains taut in operation. It is not permitted to become slack. The electrocautery element may be a cable.

The electrocautery instrument of FIG. 4 further comprises a pulley arrangement around which the electrocautery element and the second pair of driving elements are constrained to move. The pulley arrangement may comprise a first set of pulleys 411, a second set of pulleys 412, and a third set of pulleys 413.

The first set of pulleys 411 is rotatable about the first axis 405. Thus, the first set of pulleys 411 rotate about the same axis as the first joint 404. The first set of pulleys 411 comprises a first pulley 418 and a second pulley 419. Both the first pulley 418 and the second pulley 419 rotate about the first axis 405. The first pulley 418 and the second pulley 419 of the first set of pulleys are located on opposing sides of the first joint 404 in a direction transverse to the longitudinal direction of the shaft 402. The first pulley 418 and the second pulley 419 are located on opposing sides of the first pair of driving elements A1,A2.

The second set of pulleys 412 is located between the first axis 405 and the shaft 402. The second set of pulleys 412 are rotatable about axes which are parallel to the first axis 405. The second set of pulleys 412 may comprise a first pulley 414 and a second pulley 415. The first pulley 414 is rotatable about a third axis 416 which is parallel to the first axis 405. The third axis 414 is offset from the first axis 405 both in the longitudinal direction of the shaft and also transverse to the longitudinal direction of the shaft. The second pulley 415 is rotatable about a fourth axis 417 which is parallel to the first axis 405. The fourth axis 417 is offset from the first axis 405 both in the longitudinal direction of the shaft and also transverse to the longitudinal direction of the shaft. The third and fourth axes are parallel but offset from each other. The third axis 416 and fourth axis 417 are in the same plane perpendicular to the longitudinal direction of the shaft. By offsetting the first pulley 414 and the second pulley 415, the driving element wrapped around each pulley is able to extend down the shaft after having wrapped around the pulley. The first pulley 414 and second pulley 415 of the second set of pulleys 412 are located on opposing sides of the first joint 404 in a direction transverse to the longitudinal direction of the shaft 402. The first pulley 414 and second pulley 415 are located on opposing sides of the first pair of driving elements A1,A2.

The third set of pulleys 413 comprise a pair of redirecting pulleys 420, 421. The third set of pulleys is located in the articulation 403 between the first axis 405 and the second axis 408. The redirecting pulleys are each located towards the outside edge of the articulation, on opposing sides of the articulation. Each redirecting pulley is located between the longitudinal axis of the articulation and the external profile of the articulation, on opposing sides of the articulation.

The second pair of driving elements B1,B2 is constrained to move around opposing sides of the first pulley 418 and the second pulley 419 of the first set of pulleys 411. The second pair of driving elements B1,B2 is constrained to move around opposing sides of the first pulley 414 and the second pulley 415 of the second set of pulleys 412. The second pair of driving elements is constrained to move around opposing sides of the first pulley 418 of the first set of pulleys 411 and the first pulley 414 of the second set of pulleys 412. The second pair of driving elements is constrained to move around opposing sides of the second pulley 419 of the first set of pulleys 411 and the second pulley 415 of the second set of pulleys 412.

The third set of pulleys 413 are positioned so as to redirect the second pair of driving elements B1,B2 from the first set of pulleys 411 to the second joint 407. The second pair of driving elements B1,B2 is constrained to move around redirecting pulley 421 (not visible in FIG. 4). Redirecting pulley 421 rotates about a first redirecting pulley axis 422. The first redirecting pulley axis 422 is at an angle φ to the first axis 405. The redirecting pulley 421 causes the driving element B1 to wrap more fully around the second joint 407 than would happen if the redirecting pulley 421 was not there, thereby increasing the length of engagement between the driving element B1 and the second joint 407.

The electrocautery element E1 is constrained to move around opposing sides of the first pulley 418 of the first set of pulleys 411 and the first pulley 414 of the second set of pulleys 412. The electrocautery element E1 is constrained to move around redirecting pulley 420. Redirecting pulley 420 rotates about a second redirecting pulley axis 423. The second redirecting pulley axis 423 is at an angle δ to the first axis 405.

The electrocautery element E1 has a symmetrically opposing path around the pulley arrangement to the driving element B1. In the straight configuration of the electrocautery instrument in which the electrocautery end effector is aligned with the shaft, the path of the driving element B1 around the pulley arrangement is rotationally symmetrical about the longitudinal axis of the shaft 406 to the path of the electrocautery element about the pulley arrangement. The path length of the electrocautery element E1 between the shaft and the second joint is the same as the path length of the driving element B1 between the shaft and the second joint. Thus, as the electrocautery end effector is articulated by the articulation 403, the electrocautery element E1 remains taut whilst accommodating full rotation of the first and second joints.

The electrocautery element E1 is connected to the electrocautery end effector 401 at a connection point 424. Between the pulley arrangement and the connection point 424, the electrocautery element E1 is constrained to wrap around the second axis 408. This is more easily seen on FIG. 5. The electrocautery element E1 wraps around the second axis at least one full revolution in a straight configuration of the electrocautery instrument in which the electrocautery end effector is aligned with the shaft. The electrocautery element E1 may wrap around the second axis one and a half revolutions in the straight configuration of the electrocautery instrument. Suitably, the electrocautery element E1 is seated in a groove about the second axis 408 (not shown). As the electrocautery end effector 401 is articulated about the second joint 407 in a first rotational direction, the electrocautery element E1 winds about the second axis 408. The electrocautery element E1 thereby accommodates the rotation without becoming slack. As the electrocautery end effector 401 is articulated about the second joint 407 in a second rotational direction which opposes the first rotational direction, the electrocautery element E1 unwinds about the second axis 408. The electrocautery element E1 thereby accommodates the rotation without becoming so taut as to restrict the rotation of the electrocautery end effector in the second rotational direction.

Figure 6:
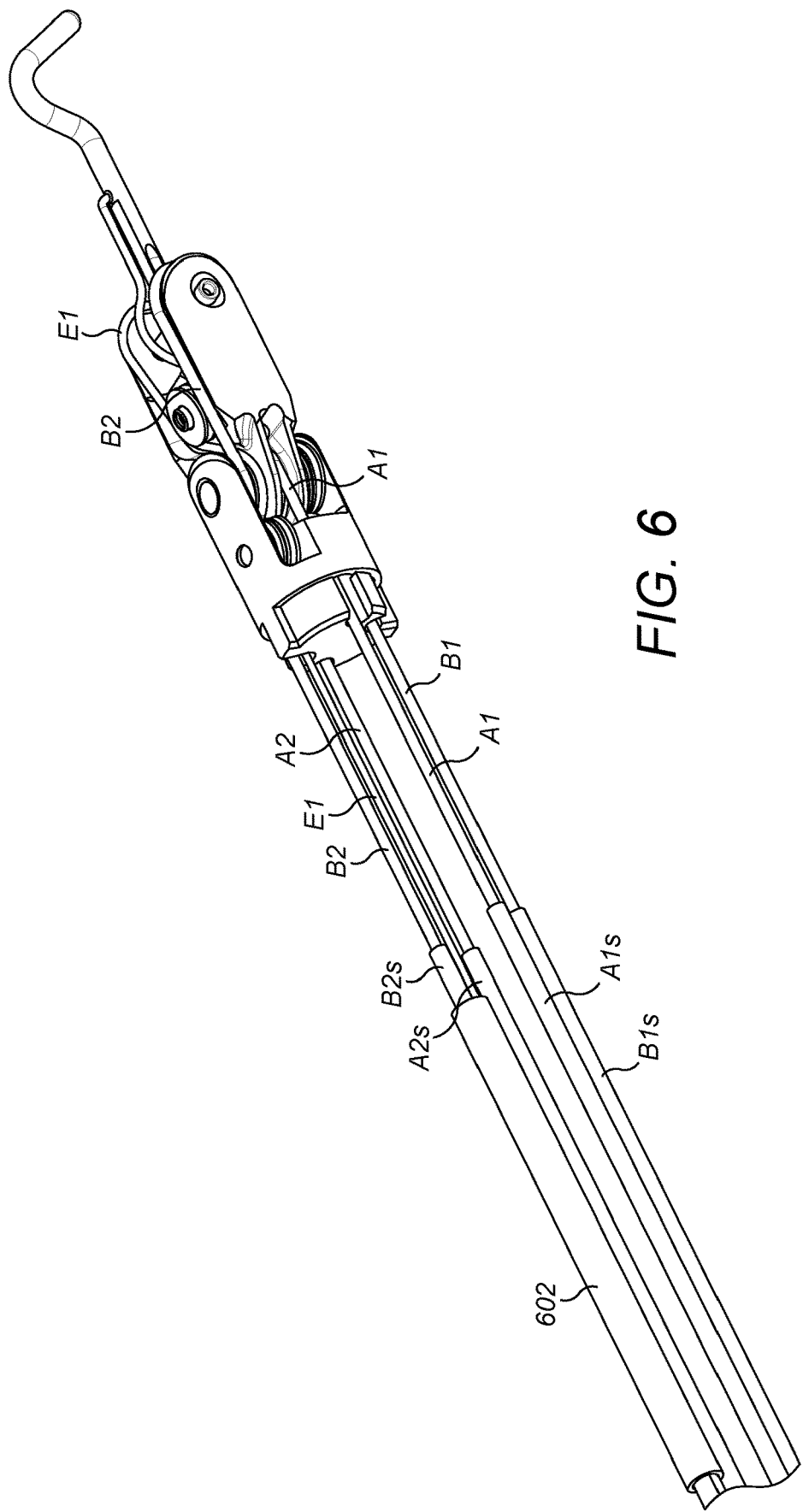
FIG. 6 illustrates an arrangement of driving elements and an electrocautery element in the shaft of the electrocautery instrument of FIGS. 4 and 5.

FIG. 6 illustrates an exemplary arrangement of the driving elements and electrocautery element in the shaft of the electrocautery instrument. The outer casing of the shaft is not shown for ease of illustration.

As can be seen in FIG. 6, the electrocautery element E1 is attached to one of the driving elements in the shaft. The electrocautery element E1 is attached to one of the second pair of driving elements in the shaft. In the example illustrated, the electrocautery element E1 is attached to the second one B2 of the second pair of driving elements. This is the other driving element of the second pair of driving elements to the driving element which the electrocautery element E1 has a symmetrically opposing path through the articulation. The electrocautery element E1 is attached to the driving element such that the electrocautery element E1 moves with the driving element as the driving element is actuated. In this way, the electrocautery element E1 is actuated to wind/unwind about the second axis 408 so as to accommodate rotation of the electrocautery end effector 401 about the second axis. Since the electrocautery element E1 is constrained to move over the first axis 405 in the same manner as the second pair of driving elements, the electrocautery element E1 also accommodates articulation of the first joint 404 about the first axis 405. The electrocautery element E1 may be bonded to the driving element B2. For example, by heat shrink 602 (FIG. 6).

The driving elements may be composed of different portions. For example, the portion of the driving element which engages components of the instrument interface (such as pulleys and interface elements) may be flexible. Similarly, the portion of the driving element which engages components of the distal end of the surgical instrument (such as the pulleys and joints in the articulation) may be flexible. Between these two flexible portions, the driving element may comprise a spoke. In the example of FIG. 6, each driving element A1, A2, B1, B2 comprises a spoke portion A1s, A2s, B1s, B2s within the shaft. The spokes are stiffer and stronger than the flexible portions. Suitably, the spokes are rigid. The spokes may be hollow. Typically, the spokes have a larger diameter than the flexible portions. Thus, the flexible portions may be cables, and the spokes hollow tubes. The flexible portions may terminate where they meet the spokes. Alternatively, the spokes may encapsulate the material of the flexible portions. For example, the spokes may be rigid sheaths which cover flexible cables. Suitably, the electrocautery element E1 is connected to the spoke portion of the driving element B2.

Figure 7:
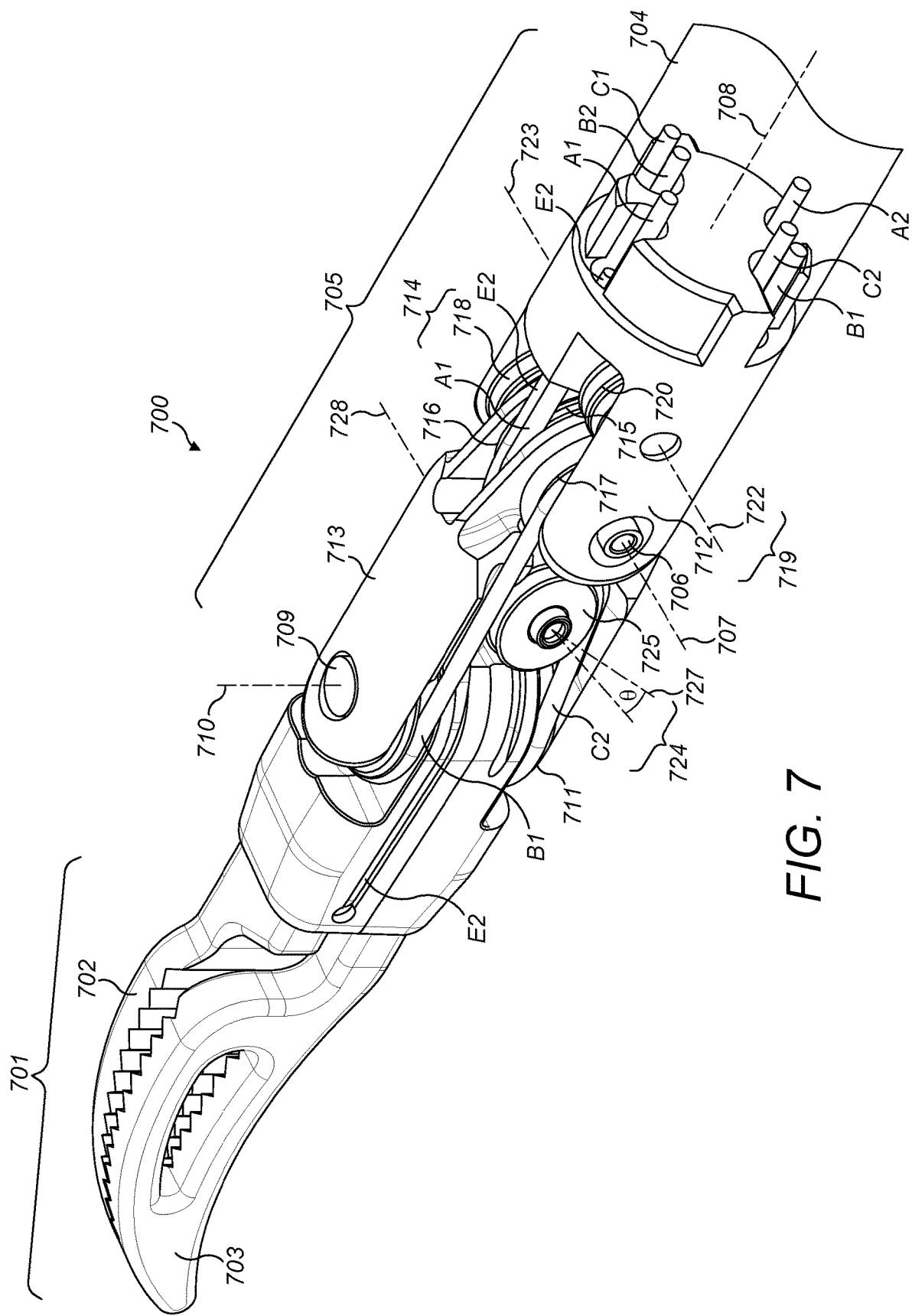
FIGS. 7, 8 and 9 illustrate a distal end of a bipolar electrocautery instrument.

FIG. 7 illustrates the distal end of a second exemplary electrocautery instrument 700. The electrocautery end effector 701 illustrated is a bipolar device having two electrocautery end effector elements 702 and 703. The electrocautery end effector elements depicted are opposing jaws. It will be understood that this is for illustrative purposes only. The electrocautery end effector elements may take any suitable shape. As another example, the electrocautery end effector elements may be scissors. The electrocautery end effector 701 is connected to the shaft 704 by articulation 705. Articulation 705 comprises joints which permit the electrocautery end effector 701 to move relative to the shaft 704. A first joint 706 permits the electrocautery end effector 701 to rotate about a first axis 707. The first axis 707 is transverse to the longitudinal axis of the shaft 708. A second joint 709 permits the first electrocautery end effector element 702 to rotate about a second axis 710. The second axis 710 is transverse to the first axis 707. A third joint 711 permits the second electrocautery end effector element 703 to rotate about the second axis 710. Suitably, rotation of the first electrocautery end effector element 702 about the second axis 710 is independent of rotation of the second electrocautery end effector element 703 about the second axis 710.

FIG. 7 depicts a straight configuration of the electrocautery instrument in which the electrocautery end effector is aligned with the shaft. In this orientation, the longitudinal axis of the shaft 708 is coincident with the longitudinal axis of the articulation and the longitudinal axis of the electrocautery end effector. Articulation of the first, second and third joints enables the electrocautery end effector to take a range of attitudes relative to the shaft.

The articulation 705 comprises a first body part 712 and a second body part 713. The first body part connects the shaft 704 to the second body part 713. The first body part 712 is fast with the shaft 704. The first body part is connected to the second body part by the first joint 706. The second body part 713 connects the first body part 712 to the electrocautery end effector 701. The second body part 711 is connected to the first body part by the first joint 706, and is connected to the electrocautery end effector 701 by the second and third joints 709 and 711. Thus, the first joint 706 permits the second body part 713 to rotate relative to the shaft 704 about the first axis 707; and the second and third joints 709 and 711 permit the electrocautery end effector 701 to rotate relative to the second body part 713 about the second axis 710.

The joints of the articulation are driven by driving elements. The properties of the driving elements are as described with respect to the electrocautery instrument of FIGS. 4 to 6. Suitably, each joint is driven by a pair of driving elements. The first joint 706 is driven by a first pair of driving elements A1,A2. The second joint 709 is driven by a second pair of driving elements B1,B2. The third joint 711 is driven by a third pair of driving elements C1,C2. Suitably, each joint is driven by its own pair of driving elements. In other words, each joint is driven by a dedicated pair of driving elements. Suitably, the joints are independently driven. A pair of driving elements may be constructed as a single piece. This single piece may be secured to the joint at one point, thereby ensuring that when the pair of driving elements is driven, the drive is transferred to motion of the joint about its axis. Alternatively, a pair of driving elements may be constructed as two pieces. In this case, each separate piece is secured to the joint.

The electrocautery end effector 701 is powered by a pair of electrocautery elements E1,E2. The electrocautery elements connect to separate parts of the electrocautery end effector 701 which are insulated from each other. In the example of FIG. 7, the first electrocautery element E1 is connected to the first electrocautery end effector element 702, and the second electrocautery element E2 is connected to the second electrocautery end effector element 703. Suitably, the first electrocautery element E1 terminates at the first electrocautery end effector element 702, and the second electrocautery element E2 terminates at the second electrocautery end effector element 703. The first electrocautery element E1 may be overmoulded with insulation material where it terminates at the first electrocautery end effector element. The second electrocautery element E2 may be overmoulded with insulation material where it terminates at the second electrocautery end effector element. When the two electrocautery end effector elements are closed onto tissue, current can be applied via the electrocautery elements to cut or coagulate the tissue captured between the end effector elements.

The electrocautery elements E1,E2 extend from the electrocautery end effector 701 through the articulation, through the shaft to the instrument interface. Suitably, each electrocautery element can be flexed laterally to its main extent at least in those regions where it engages the internal components of the articulation and instrument interface. In other words, the electrocautery element can be flexed transverse to its longitudinal axis in the specified regions. This flexibility enables the electrocautery element to wrap around the internal structure of the instrument, such as the joints and pulleys. The electrocautery element may be wholly flexible transverse to its longitudinal axis. The electrocautery element may not be flexible along its main extent. The electrocautery element resists compression and tension forces applied along its length. In other words, the electrocautery element resists compression and tension forces acting in the direction of its longitudinal axis. The electrocautery element has a high modulus. The electrocautery element remains taut in operation. It is not permitted to become slack. The electrocautery element may be a cable.

The electrocautery instrument of FIG. 7 further comprises a pulley arrangement around which the electrocautery elements E1, E2 and the pairs of driving elements are constrained to move.

The pulley arrangement comprises a first set of pulleys 714 rotatable about the first axis 707. Thus, the first set of pulleys 714 rotate about the same axis as the first joint 706. The first set of pulleys 714 comprises a first pulley 715 and a second pulley 716. The first and second pulleys are centrally located in the articulation, on either side of the longitudinal axis 708. The first pulley 715 is adjacent the second pulley 716. The first pulley may abut the second pulley. The first and second pulleys are fast with each other. The first and second pulleys are constrained to rotate together about the first axis 707.

A first one of the first pair of driving elements A1 is constrained to move around the first pulley 715, and terminates at that first pulley 715. A second one of the first pair of driving elements A2 is constrained to move around an opposing side of the second pulley 716, and terminates at that second pulley 716. Thus, the individual driving elements A1 and A2 are not connected to each other around the first joint 706. Driving element A1 may terminate in a crimp, that crimp being captured in a feature on the first pulley 715. Similarly, driving element A2 may terminate in a crimp, that crimp being captured in a feature on the second pulley 716. Tension applied to driving element A1 causes the first joint to rotate in one rotational direction about the first axis 707, and tension applied to driving element A2 causes the second joint to rotate in the opposing rotational direction about the first axis 707. Since the driving elements A1 and A2 are constrained to move around different pulleys, they are offset from one another, lying on either side of a plane with separates the first and second pulleys 715, 716. The first and second driving elements A1 and A2 have symmetrically opposing paths around the first set of pulleys 714.

The first electrocautery element E1 is constrained to move around the first pulley 715 as it passes from the shaft 704 to the electrocautery end effector 701. E1 moves around the opposing side of the first pulley 715 to that which the first driving element A1 is secured to. The second electrocautery element E2 is constrained to move around the second pulley 716 as it passes from the shaft 704 to the electrocautery end effector 701. E2 moves around the opposing side of the second pulley 716 to that which the second driving element A2 is secured to. Thus, E1 is constrained to move around an opposing side of the first pulley 715 to the side of the second pulley 716 which E2 is constrained to move around. Thus, E1 and E2 have symmetrically opposing paths around the first set of pulleys 714.

Separating the first pair of driving elements A1 and A2 to drive the first joint 706 about different pulleys 715, 716, enables space to run the electrocautery elements E1, E2 over the first joint about separate paths which are identical in length but symmetrically opposed. This enables the electrocautery elements E1, E2 to equally accommodate motion of the electrocautery end effector 701 about the first axis 707.

The first set of pulleys 714 further comprises a third pulley 717 and a fourth pulley 718, both of which are rotatable about the first axis 707. The third pulley 717 is located on one side of the first and second pulleys 715, 716, and the fourth pulley 718 is on the other side of the first and second pulleys 715, 716. The third pulley 717 and the fourth pulley 718 are located on opposing sides of the first pair of driving elements A1,A2. The second pair of driving elements B1,B2 is constrained to move around opposing sides of the third pulley 717 and the fourth pulley 718 of the first set of pulleys 714. The third pair of driving elements C1,C2 is constrained to move around opposing sides of the third pulley 717 and the fourth pulley 718 of the first set of pulleys 714.

The second and third pairs of driving elements are each constrained to extend over the first joint 706 in order to reach the second and third joints respectively. Thus, the first one of the second pair of driving elements B1 passes over one side of the third pulley 717 of the first set of pulleys on the first joint axis 707, and the second one of the second pair of driving elements B2 passes over an opposing side of the fourth pulley 718 of the first set of pulleys on the first joint axis 707, so that whatever rotation there is of the second body part 713 about the first joint 706, the length of the second pair of driving elements B1,B2 is maintained the same. Similarly, the second one of the third pair of driving elements C2 passes over one side of the third pulley 720 of the first set of pulleys on the first joint axis 707, and the first one of the third pair of driving elements C1 passes over an opposing side of the fourth pulley 722 of the first set of pulleys on the first joint axis 707, so that whatever rotation there is of the second body part 713 about the first joint 706, the length of the third pair of driving elements C1,C2 is maintained the same. If the arrangement of the instrument interface is symmetric for both the second pair of driving elements B1,B2 and the third pair of driving elements C1,C2, then the length of the second pair of driving elements is the same as the length of the third pair of driving elements for all rotation angles of the second body part 713 about the first joint 706.

The pulley arrangement may further comprise a second set of pulleys 719 located between the first axis 707 and the shaft 704. The second set of pulleys 719 are rotatable about axes which are parallel to the first axis 707. The second set of pulleys 719 may comprise a first pulley 720 and a second pulley 721. The first pulley 720 is rotatable about a third axis 722 which is parallel to the first axis 707. The third axis 722 is offset from the first axis 707 both in the longitudinal direction of the shaft and also transverse to the longitudinal direction of the shaft. The second pulley 721 is rotatable about a fourth axis 723 which is parallel to the first axis 707. The fourth axis 723 is offset from the first axis 707 both in the longitudinal direction of the shaft and also transverse to the longitudinal direction of the shaft. The third and fourth axes are parallel but offset from each other. The third axis 722 and fourth axis 723 are in the same plane perpendicular to the longitudinal direction of the shaft. By offsetting the first pulley 720 and the second pulley 721, the driving element wrapped around each pulley is able to extend down the shaft after having wrapped around the pulley. The first pulley 720 and second pulley 721 of the second set of pulleys 719 are located on opposing sides of the first joint 706 in a longitudinal direction of the shaft 704. The first pulley 720 and second pulley 721 are located on opposing sides of the first pair of driving elements A1,A2.

The second pair of driving elements B1,B2 is constrained to move around opposing sides of the first pulley 720 and the second pulley 721 of the second set of pulleys 719. The second pair of driving elements is constrained to move around opposing sides of the third pulley 717 of the first set of pulleys 714 and the first pulley 720 of the second set of pulleys 719. The second pair of driving elements is constrained to move around opposing sides of the fourth pulley 718 of the first set of pulleys 714 and the second pulley 721 of the second set of pulleys 719.

The third pair of driving elements C1,C2 is constrained to move around opposing sides of the first pulley 720 and the second pulley 721 of the second set of pulleys 719. The third pair of driving elements is constrained to move around opposing sides of the third pulley 717 of the first set of pulleys 714 and the first pulley 720 of the second set of pulleys 719. The third pair of driving elements is constrained to move around opposing sides of the fourth pulley 718 of the first set of pulleys 714 and the second pulley 721 of the second set of pulleys 719.

The second pair of driving elements B1,B2 has a symmetrically opposing path around the first and second sets of pulleys 714, 719 than the third pair of driving elements C1,C2. In the straight configuration of the instrument in which the end effector is aligned with the shaft, the path of the second pair of driving elements B1,B2 about the pulley arrangement is rotationally symmetrical about the longitudinal axis of the shaft 708 to the path of the third pair of driving elements C1,C2 about the pulley arrangement.

The pulley arrangement may further comprise a third set of pulleys 724 located in the articulation between the first axis 707 and the second axis 710. The third set of pulleys 724 comprise a pair of redirecting pulleys 725,726. The redirecting pulleys are each located towards the outside edge of the articulation, on opposing sides of the articulation. Each redirecting pulley is located between the longitudinal axis of the articulation and the external profile of the articulation, on opposing sides of the articulation.

The third set of pulleys 724 are positioned so as to redirect the second pair of driving elements B1,B2 from the first set of pulleys 714 to the second joint 709 and to redirect the third pair of driving elements C1,C2 from the first set of pulleys 714 to the third joint 711. The second pair of driving elements B1,B2 is constrained to move around redirecting pulley 726 (not visible in FIG. 7). Redirecting pulley 726 rotates about a first redirecting pulley axis 728. The first redirecting pulley axis 728 is at an angle θ to the first axis 707. The third pair of driving elements C1,C2 is constrained to move around redirecting pulley 725. Redirecting pulley 725 rotates about a second redirecting pulley axis 727. The second redirecting pulley axis 727 is at an angle φ to the first axis 707. The redirecting pulley 726 causes the second pair of driving elements B1,B2 to wrap more fully around the second joint 709 than would happen if the redirecting pulley 726 was not there, thereby increasing the length of engagement between the second pair of driving elements B1,B2 and the second joint 709. Similarly, the redirecting pulley 725 causes the third pair of driving elements C1,C2 to wrap more fully around the third joint 711 than would happen if the redirecting pulley 725 was not there, thereby increasing the length of engagement between the third pair of driving elements C1,C2 and the third joint 711.

Figure 8:
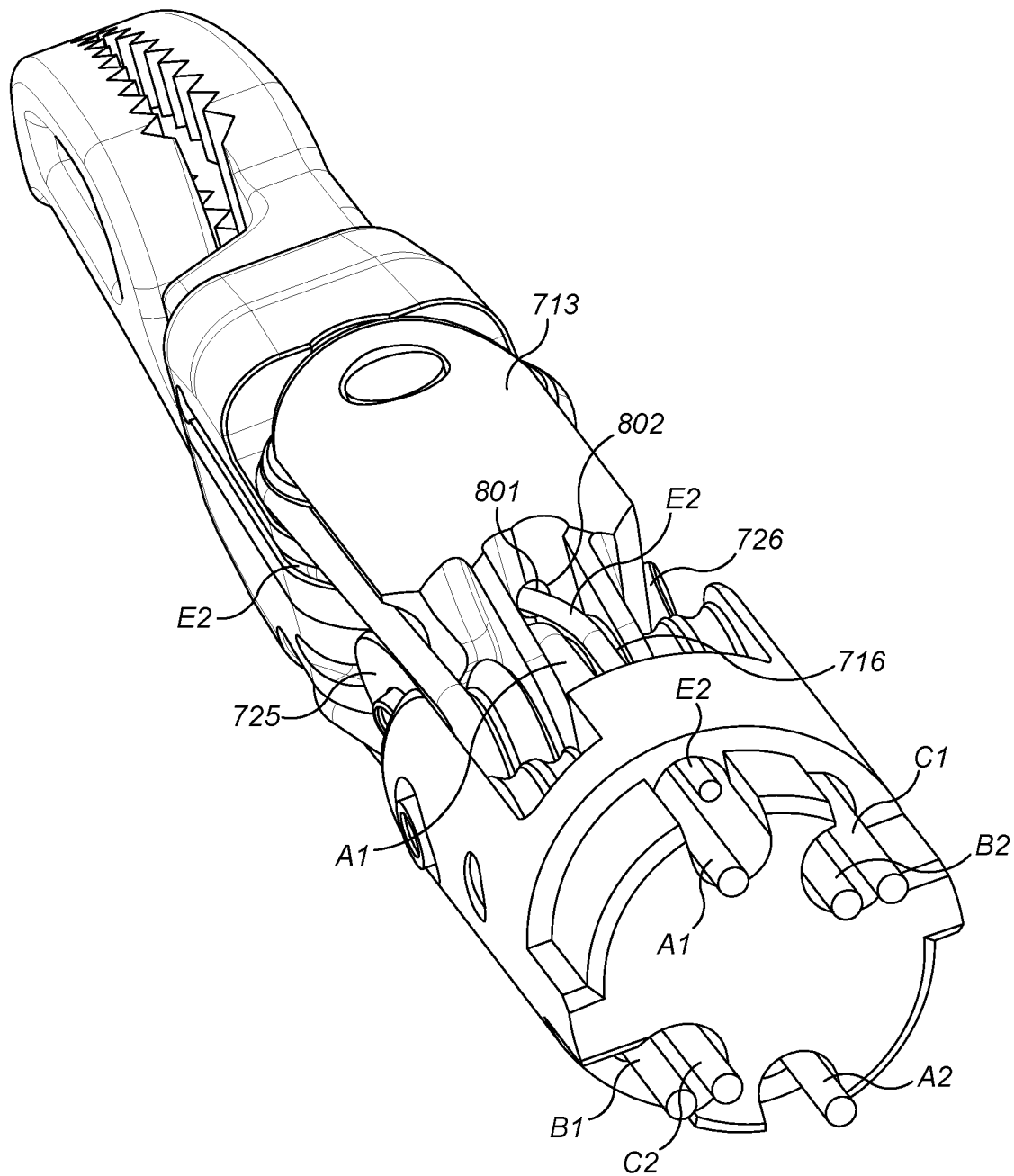
Figure 9:
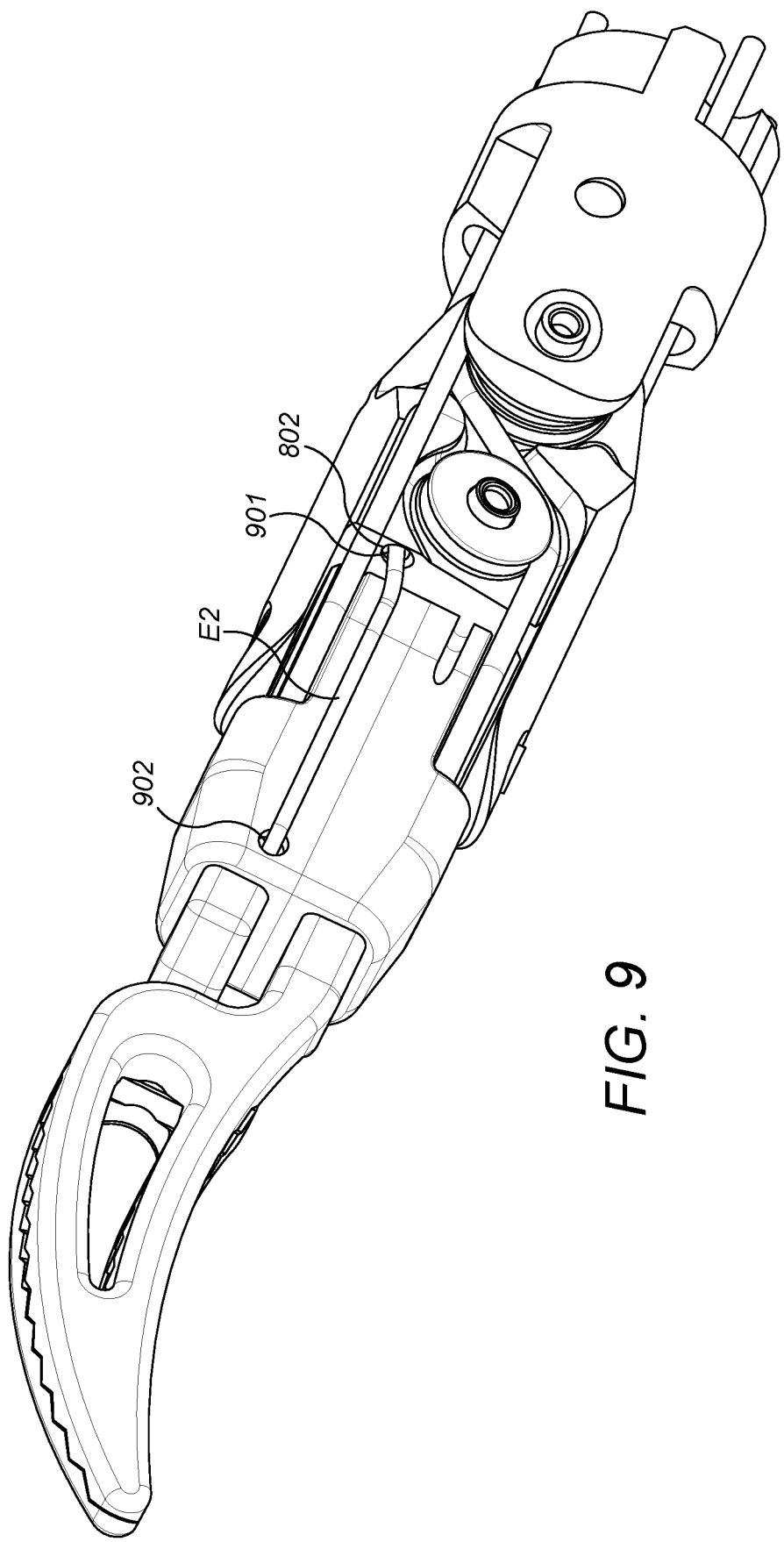

The electrocautery elements E1, E2 are routed from the first set of pulleys 714 to the electrocautery end effector 701 through the second body part 713. An exemplary routing is shown in FIGS. 7 to 9. From the pick up point on the second pulley 716 of the first set of pulleys 714, the second electrocautery element E2 enters a first end 801 of a through hole 802 in the second body part 713, passes through the through-hole 802 and emerges from a second end 901 of the through-hole 802. The second end 901 of the through-hole 802 is located between the redirecting pulley 725 and the second joint 709. The second electrocautery element E2 then passes in a channel in the electrocautery end effector to a through-hole 902 to its connection point with the electrocautery end effector element 702. The first electrocautery element E1 has a symmetrically opposing path to the second electrocautery element E2 from the pick up point of the first pulley 715 of the first set of pulleys 714 to the electrocautery end effector element 703.

The electrocautery elements E1, E2 are secured to their respective electrocautery end effector elements 702, 703 at connection points. For example, each electrocautery element may be crimped to its respective electrocautery end effector element by deforming the electrocautery end effector element mechanically. The electrocautery element and its electrocautery end effector element may then be overmoulded with insulation material.

Suitably, during assembly, each electrocautery element is attached to its electrocautery end effector element whilst the electrocautery instrument is in a configuration in which that electrocautery element has the highest tension. In this configuration, the second body part 713 is in a maximum rotational position about the first joint 706 relative to the shaft 704, and the electrocautery end effector element is in a maximum rotational position about the second/third joint relative to the second body part 713. On returning the electrocautery instrument to the straight configuration, the tension on the electrocautery element is reduced. The length of each electrocautery element through the articulation 705 is similar to the length of one of the second pair of driving elements. This enables the electrocautery element to accommodate movement of the electrocautery instrument about the first, second and third joints without the electrocautery element becoming overly slack or taut.

Figure 5:
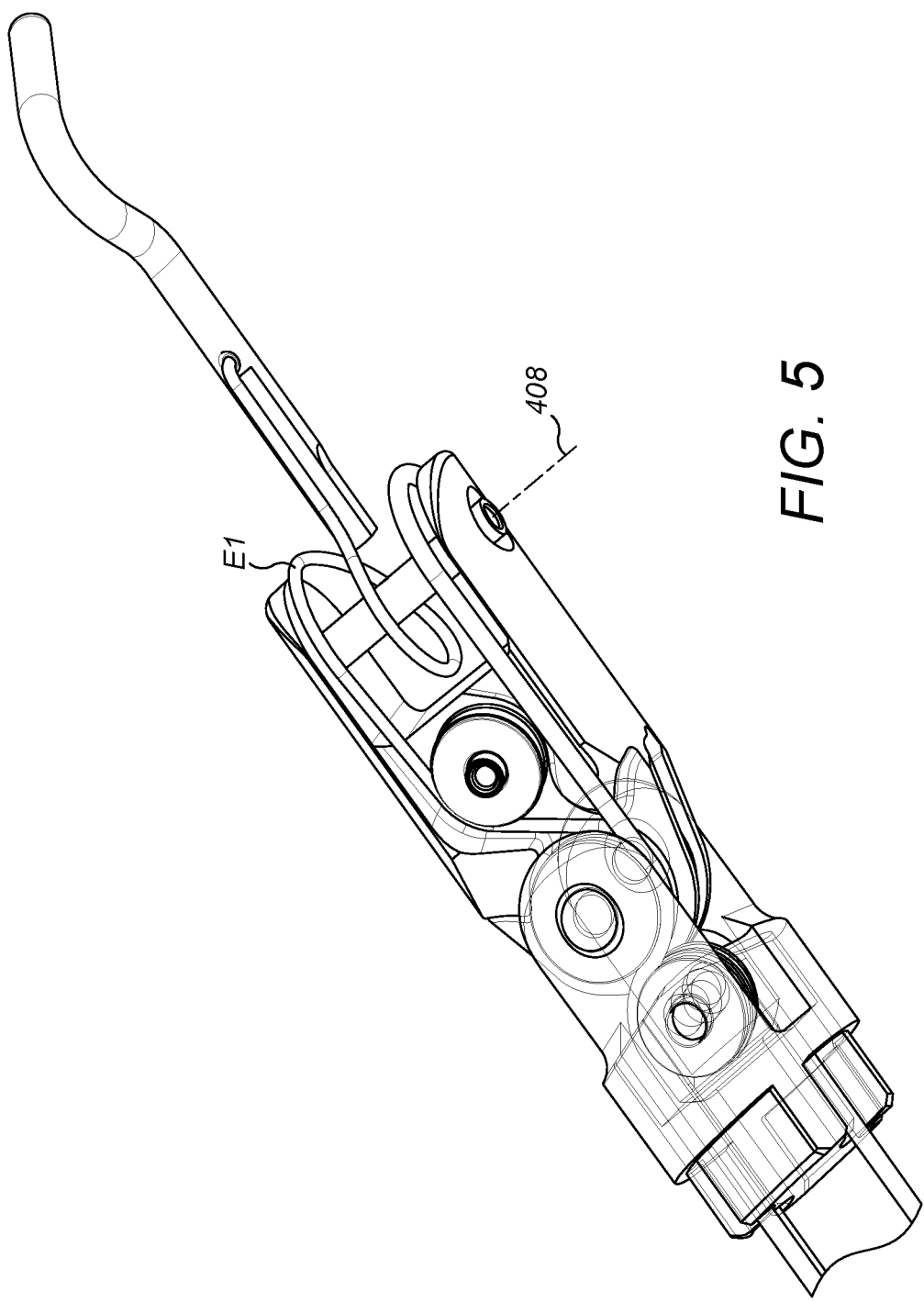

Alternatively, each electrocautery element E1, E2 of the bipolar electrocautery instrument may wrap around the second axis 710 as described with respect to FIGS. 4 and 5.

FIGS. 7 to 9 illustrate a bipolar electrocautery instrument having two electrocautery end effector elements 702, 703 with the electrocautery elements E1, E2 connected to separate ones of the end effector elements. Alternatively, the electrocautery elements E1, E2 may be connected to the same end effector element. This may be because the bipolar electrocautery instrument only has a single end effector element. Alternatively, the bipolar electrocautery instrument may have two or more end effector elements, but only one is powered by the electrocautery elements. In either case, the two regions of the end effector element that the electrocautery elements are connected to are electrically isolated from each other. When both regions are contacting tissue, current is applied through the electrocautery elements causing the captured tissue to be cauterised.

As described with respect to the electrocautery instrument of FIGS. 4 to 6, the electrocautery elements may be attached to the driving elements in the shaft. Specifically, the second electrocautery element E2 may be attached to one of the second pair of driving elements in the shaft. For example, E2 may be attached to B1 in the shaft. The first electrocautery element E1 may be attached to one of the third pair of driving elements in the shaft. For example, E1 may be attached to C1 in the shaft. Each electrocautery element is attached to the driving element in the shaft such that the electrocautery element moves with the driving element as the driving element is actuated. The electrocautery elements may be bonded to their respective driving element, for example by heat shrinking. The driving elements may be composed of flexible portions and spoke portions as described with respect to FIG. 6. The electrocautery elements may be connected to the spoke portion of the driving elements.

Figure 10:
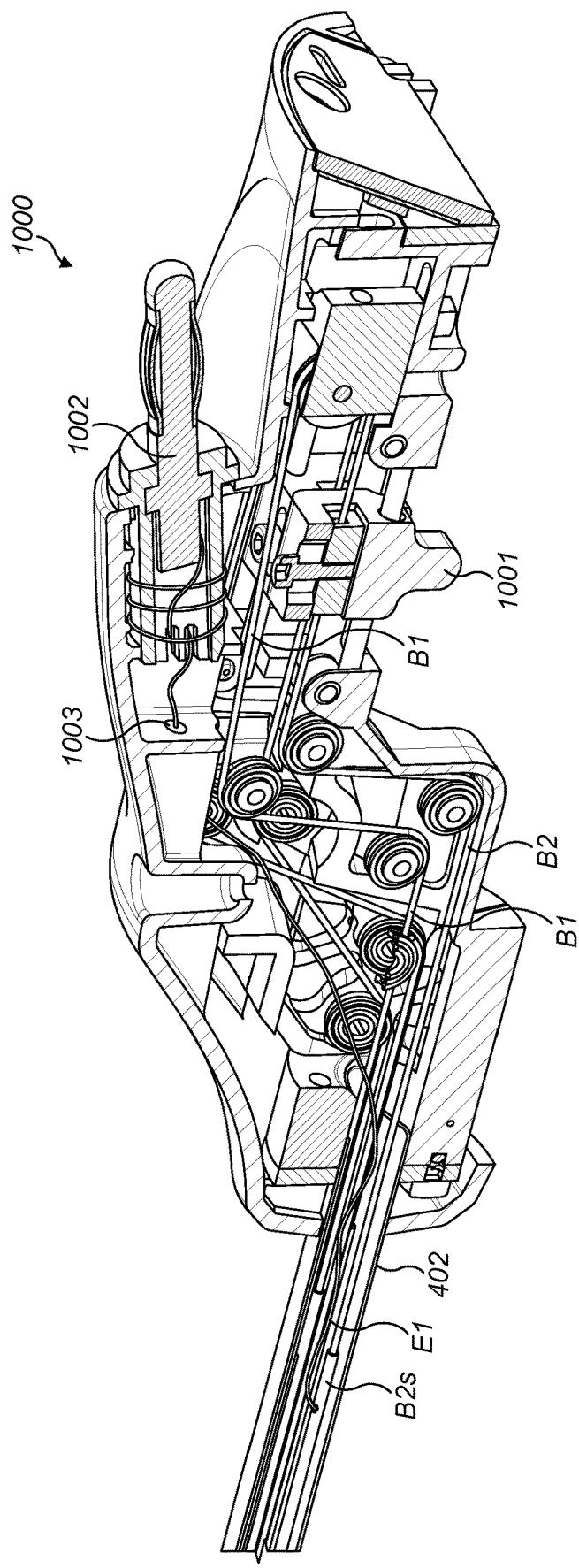
FIGS. 10 and 11 illustrate a proximal end of the electrocautery instrument of FIGS. 4 to 6.

At the proximal end of the electrocautery instrument, the shaft is attached to the base where the instrument interfaces the robot arm. FIG. 10 illustrates an exemplary proximal end 1000 of the electrocautery instrument described in FIGS. 4 to 6. The driving elements are routed to instrument interface elements. For example, driving elements B1,B2 are routed to instrument interface element 1001. Instrument interface element 1001 interfaces a drive assembly interface element of the robot arm, which drives the instrument interface element 1001, and hence the driving elements B1, B2 linearly parallel to the longitudinal axis of the shaft of the instrument.

As described above, the electrocautery element E1 is attached to a driving element in the shaft of the instrument. The electrocautery element E1 and the driving element bifurcate in the shaft proximal to where the shaft is attached to the base of the instrument. The electrocautery element E1 is routed through the instrument base to where it is electrically connected to a connector 1002. The connector 1002 connects the electrocautery element E1 to a power source. Any suitable connector may be used. For example, FIG. 10 illustrates a banana plug as the connector to the power source. The electrocautery element may wrap around the connector several times, as shown in FIG. 10. This wrapping provides strain relief.

Figure 11:
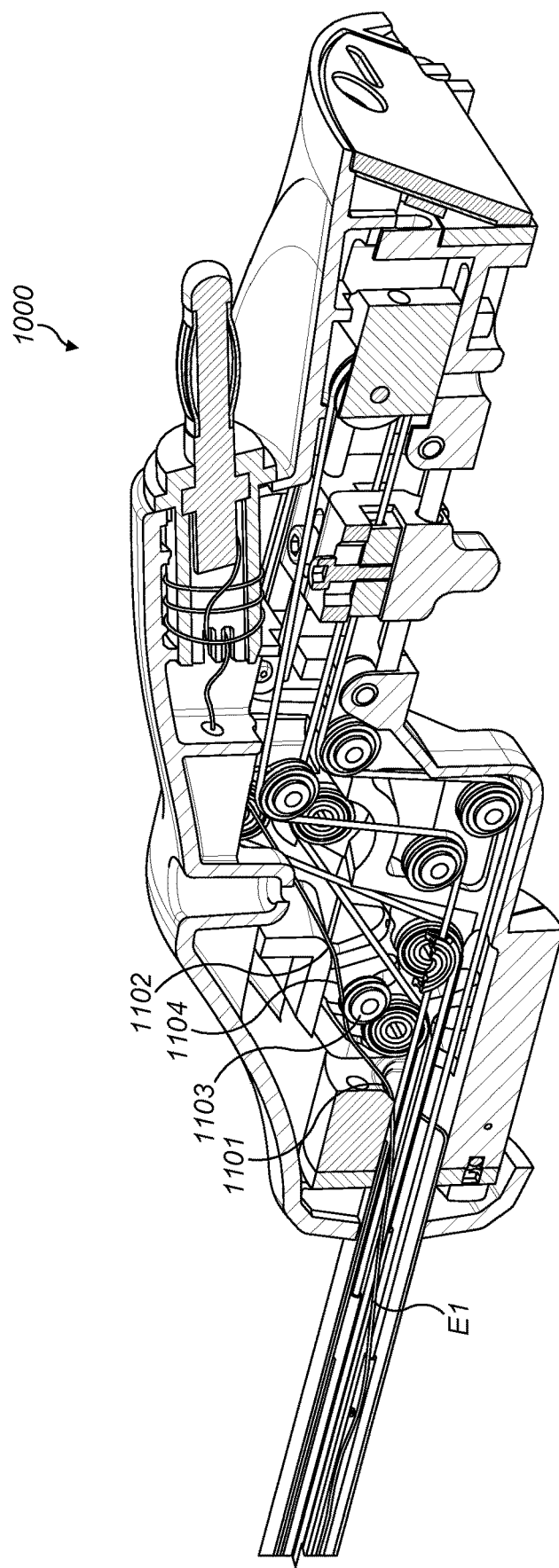

The electrocautery element E1 is routed from the connector 1002 to the shaft 402 by any suitable route. The electrocautery element E1 is constrained by its connection to the driving element in the shaft, and hence its path through the base of the instrument does not need to be constrained. Thus, the electrocautery element E1 may be unconstrained in the instrument base between its connection to the driving element in the shaft and its connection to the connector 1002. Alternatively, the electrocautery element E1 may be lightly constrained between its connection to the driving element in the shaft and its connection to the connector 1002 so as to prevent it chafing on any internal components of the base or interfering with the operation of any internal components of the base. For example, the electrocautery element E1 may pass through through-hole 1003. This prevents it interfering with driving element B1. The electrocautery element E1 may be tightly constrained between its connection to the driving element in the shaft and its connection to the connector 1002, in a similar manner to the constraints of the driving elements A1,A2, and B1,B2. For example, the electrocautery element E1 may be constrained to move around a similar set of pulleys (or a subset of the pulleys) as that around which the driving elements A1,A2 and the driving elements B1,B2 are constrained to move. In this case, the electrocautery element E1 remains taut in the instrument base, thereby preventing interference with the driving elements A1,A2,B1,B2. The interior housing of the base may be shaped so as to reduce the likelihood of chafing the electrocautery element E1. For example, FIG. 11 illustrates an example in which the interior casing of the base comprises radii 1101, 1102 which the electrocautery element E1 bears against as it is routed from the shaft to the connector. A tension pulley 1103 is mounted on a resilient lug 1104 in such a location as to tension the electrocautery element E1 against the radii 1101, 1102.

A corresponding proximal end to that illustrated in FIGS. 10 and 11 may be implemented for the bipolar electrocautery instrument described with respect to FIGS. 7 to 9. In this case there are two electrocautery elements E1 and E2. E1 and E2 are each routed from their connections to the driving elements in the shaft to their individual connections with the connector using any of the mechanisms described with respect to FIGS. 10 and 11. As in the remainder of the electrocautery instrument, the electrocautery elements E1 and E2 are insulated from each other in the base.

The electrocautery instrument could be used for non-surgical purposes. For example it could be used in a cosmetic procedure.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A robotic surgical instrument comprising:
 a shaft;
 an electrocautery end effector powered by an electrocautery element; and
 an articulation connecting the electrocautery end effector to the shaft, the articulation comprising:
  a first joint driveable by a first pair of driving elements, the first joint permitting the electrocautery end effector to rotate about a first axis transverse to a longitudinal axis of the shaft, and
  a second joint driveable by a second pair of driving elements, the second joint permitting the electrocautery end effector to rotate about a second axis transverse to the first axis;
  wherein the electrocautery element is constrained to move around the first axis and constrained to wrap at least one full revolution around the second axis;
  wherein the path of the electrocautery element between the shaft and the second joint rotationally symmetrically opposes the path of a first one of the second pair of driving elements about the longitudinal axis of the shaft between the shaft and the second joint; and
  wherein the articulation comprises a pulley arrangement around which the second pair of driving elements and the electrocautery element are constrained to move, the pulley arrangement comprising a first set of pulleys rotatable about the first axis, each of the second pair of driving elements and the electrocautery element being in contact with and constrained to move over the first set of pulleys such that the first set of pulleys redirects the path of each of the second pair of driving elements and the electrocautery element, the electrocautery element and the first one of the second pair of driving elements being constrained to have rotationally symmetrically opposing paths about the longitudinal axis of the shaft around the first set of pulleys.

2. A robotic surgical instrument as claimed in claim 1, wherein the electrocautery element is constrained to wrap at least one and a half revolutions around the second axis.

3. A robotic surgical instrument as claimed in claim 1, wherein the electrocautery element is seated in a groove about the second axis.

4. A robotic surgical instrument as claimed in claim 1, wherein the pulley arrangement comprises a second set of pulleys located between the first axis and the shaft.

5. A robotic surgical instrument as claimed in claim 1, wherein the pulley arrangement comprises a third set of pulleys located between the first axis and the second axis.

6. A robotic surgical instrument as claimed in claim 1, wherein the electrocautery element is bonded to a second one of the second pair of driving elements in the shaft.

7. A robotic surgical instrument as claimed in claim 6, wherein the second one of the second pair of driving elements comprises a flexible portion and a spoke, the electrocautery element being bonded to the spoke.

8. A robotic surgical instrument as claimed in claim 1, wherein the electrocautery element is connected to the electrocautery end effector.

9. A robotic surgical instrument as claimed in claim 8, wherein the electrocautery element terminates at the electrocautery end effector.

10. A robotic surgical instrument as claimed in claim 9, wherein the electrocautery element is overmoulded with insulation material where it terminates at the electrocautery end effector.

11. A robotic surgical instrument as claimed in claim 1, wherein the electrocautery element is a cable.

12. A robotic surgical instrument as claimed in claim 1, wherein the first pair of driving elements are cables in the articulation.

13. A robotic surgical instrument as claimed in claim 1, wherein the second pair of driving elements are cables in the articulation.

14. A robotic surgical instrument as claimed in claim 1, wherein the electrocautery element and the pairs of driving elements resist compression and tension forces.

15. A robotic surgical instrument as claimed in claim 1, wherein the first set of pulleys comprises a first pulley and a second pulley.

16. A robotic surgical instrument as claimed in claim 15, wherein the second pair of driving elements are in contact with and constrained to move over opposing sides of the first pulley and the second pulley of the first set of pulleys such that the first pulley and the second pulley of the first set of pulleys redirect the path of the second pair of driving elements.

17. A robotic surgical instrument as claimed in claim 15, wherein the electrocautery element is in contact with and constrained to move over the first pulley of the first set of pulleys such that the first pulley of the first set of pulleys redirects the path of the electrocautery element.

18. A robotic surgical instrument as claimed in claim 15, wherein the electrocautery element and the first one of the second pair of driving elements are constrained to have rotationally symmetrically opposing paths about the longitudinal axis of the shaft around the first pulley of the first set of pulleys.

* * * * *